June 22, 1965          N. S. KAPANY          3,190,735
METHOD OF MAKING A FIBER OPTICAL BUNDLE
Filed June 10, 1959
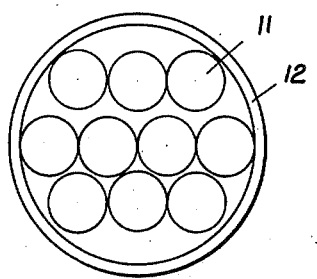
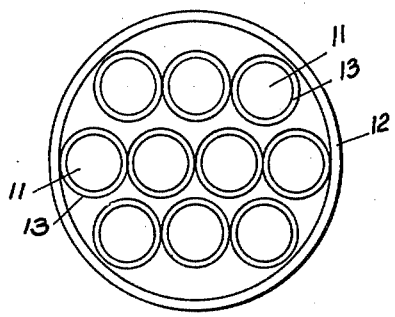
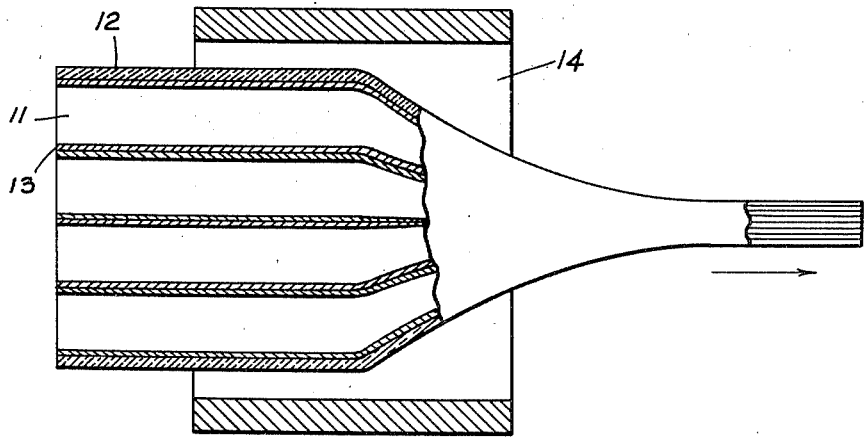
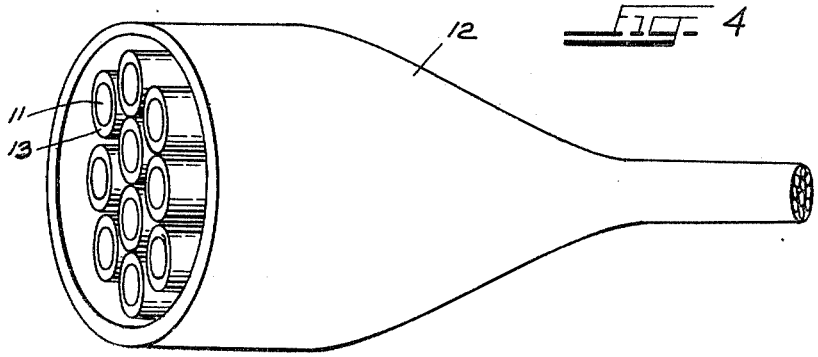
INVENTOR.
NARINDER S. KAPANY

United States Patent Office 3,190,735
Patented June 22, 1965

3,190,735
METHOD OF MAKING A FIBER OPTICAL BUNDLE
Narinder S. Kapany, Chicago, Ill., assignor, by mesne assignments, to American Optical Company, a voluntary association of Massachusetts
Filed June 10, 1959, Ser. No. 819,492
1 Claim. (Cl. 65—4)

The present invention relates to the art of fiber optics and more particularly, relates to a novel method of forming bundles of optically transparent fibers and to the bundles thus produced.

In the field of fiber optics, use is made of the phenomenon of total internal reflection whereby light is transmitted through an optically transparent dielectric fiber. This phenomenon, in combination with the ready capability of forming individual fibers into flexible fiber bundles has resulted in a multitude of uses thereof, as for example, in gastroscopes, coding and decoding devices, cathode ray tube screens, image dissectors, and for a variety of other applications where light images or similar radiant energy is to be transmitted from one plane to another. Since many of the basic principles of fiber optics have already been published it is deemed that full theoretical consideration of the phenomenon involved is unnecessary in the present specification, and for a brief introduction thereto the writer is directed to the article by Professor A. C. S. Van Heel presented in volume 24 of "De Ingenieur," 1953, and Appendix N of the book by John Strong, "Concepts of Classical Optics," 1958.

By use of both the fiber bundles of the prior art and the optically transparent bundles of fibers as produced in accord herewith it is a rather simple matter to transmit an image from one end of a fiber bundle to the other end thereof with each individual fiber comprising the bundle transmitting one image point.

One of the problems that is faced by the manufacturers and users of fiber optic bundles relates to image resolution, and particularly the improvement thereof. As will be readily apparent to those skilled in this art, since since each fiber transmits a point source, the greater is the number of fibers per unit bundle cross-sectional area, the greater will be the image resolution at the exit end, providing, of course that light leakage out of and into adjoining individual fibers is prevented, and that fiber diameter is maintained at a value somewhat larger than the wavelength of the light passing therethrough, for under such circumstances a relatively larger number of image points are transmitted.

From the foregoing discussion of the resolution problem, it becomes immediately apparent that fibers of as small diameter as possible present the optimum transmission characteristics for use and it is to the ready and convenient production of fiber bundles composed of exceptionally small diameter fibers that my invention is primarily directed. Although the manufacture of individual glass fibers is old in the art, when one realizes the problems of handling and aligning such fibers into useful transmissant bundles it is seen that the difficulties are considerable. As for example, when utilizing fibers having a diameter ranging from 5 to 50 microns there is not only the fragility of each fiber to contend with but additionally if for purposes of illustration the fibers are six inches long there remains the problem of having the input and output ends of the bundle in substantially as perfect as possible register; or stated differently, have the fibers at both ends in like geometric arrangement. As is discussed below in greater detail the instant invention is admirably suited for the fabrication of fiber optic bundles composed of aligned, ultra-small diameter fibers.

Another factor to consider in the art of transmitting images by the use of fiber optic bundles is the problem involved in light leakage from one fiber into another. In my co-pending patent application entitled, "Method of Improving the Transmission of Dielectric Fibers," U.S. Serial No. 750,811, filed July 24, 1958, now abandoned, I have made reference to and have considered in some detail this phenomenon of light leakage into and out of adjoining fibers and have discussed various modes of prevention thereof. In brief, along these lines it has been determined that by the utilization of a fiber core of relatively high index of refraction provided with a thin coating of transparent material of comparatively lower index of refraction in relationship thereto, that light leakage may be substantially eliminated from a fiber, and that by such provision all of the light impinged upon one end of the fiber is presented at the exit end thereof by means of total internal reflection. As a further modification of such coating proviso, it is additionally feasible to coat each previously coated individual fiber with a thin metallic coating or an opaque, absorbing material to even better assure the prevention of light leakage. By the practice of my present invention I am able to make fiber bundles composed of fibers of exceptionally small diameter, readily align such fibers within the bundle and at the same time minimize or eliminate light leakage from individual fibers.

Accordingly, a primary object of the present invention is to provide a novel method of forming bundles of optically transparent dielectric fibers.

Another object of my invention is to provide fiber optic bundles resulting from the instant process.

Other objects, features and advantages of my invention will become apparent to those skilled in this particular art from the following detailed disclosure thereof and from the accompanying drawings in which:

FIGURE 1 is a sectional view of the starting material in one embodiment of my invention;

FIGURE 2 is a sectional view of the starting material in a second embodiment hereof;

FIGURE 3 is a longitudinal sectional view of what occurs upon drawing in accordance with my process; and FIGURE 4 is a perspective view of the production of a fiber bundle in accordance with the teachings of my invention.

As indicated above, in accordance with the processes of making fiber bundles as taught in the prior art, the procedure has been to draw, for example, glass fibers from glass rods or the like into thin, fragile filaments of varying lengths. For example, a glass rod may be drawn out into a long, flexible fiber by the joint application of heat and tension and the resultant fiber may be then wound about a spool in much the same manner that cotton thread is so wound with care of course that the bend angle is not too small. Following this, in order to manufacture a fiber bundle the original glass filaments are cut to desired lengths and the individual fibers are then gathered together, aligned and by some means caused to adhere inter se to yield the final bundle. As indicated above such procedure entails considerable technical difficulty resulting in the fact that such fiber optic bundles in the past have proven very expensive and difficult to obtain.

In my process, on the other hand, using glass as one example of the fiber material, a number, say from 10 to 25 glass rods, are first aligned within the confines of the lumen of a glass tube and then the entire combined structure is drawn out into a fiber bundle by means of heat and pulling. In the simplest embodiment of my invention as shown in FIGURE 1, the rods 11 are aligned within the glass tube 12 prior to drawing. For purposes of preventing or minimizing light leakage it is preferred that the rods 11 be of a material having a higher refractive index than that of the tube 12.

After the alignment of the rods within the tube the multi-unit member is then drawn through a circular electrical heating oven or the like and pulled down to the desired diameter. It should be understood that the number of rods positioned within the tube or cylinder may vary over a wide range, depending upon the specific techniques and apparatus available to the user hereof. For example, by careful packing it is possible to position almost 900 1/16 inch diameter rods in a glass cylinder of 2 inch inside diameter and thus it is feasible to provide therefrom a flexible fiber bundle comprised of 900 individual small diameter fibers. One result of such pulling or drawing process is that the material comprising the tube 12 flows between the individual fibers and not only causes them to adhere but likewise since such material is selected to have a lower index of refraction than that of the rod such material acts as a light leakage preventative agent. It is also required that all of the components of the system above presented have substantially the same coefficient of thermal expansion and likewise close melting or softening points in order that the entire composite may be drawn at substantially the same time, rate and temperature. Even more specifically, it is desirable that the tube 12 have a slightly lower melting point than that of the rods 11. By so providing the tube melts before the rods soften in the heating chamber, and thus the material comprising the tube flows into the volume surrounding each rod and coats the rods before they are drawn.

In FIGURE 2 another embodiment of the composite unit prior to drawing is illustrated. In such unit the individual rods 11 are coated with a material of lower refractive index 13 and again upon drawing the entire unit is pulled down to the desired fiber size. In a modification hereof, such coated rods or fibers are additionally provided with a thin metallic coating to further prevent light leakage thereout.

Fibers of any desired cross-sectioned diameter may be produced in accord herewith by the drawing process selected by the user hereof. As a practical matter it should be recalled that fiber diameter should never be less than the wavelength of light or the energy selected for transmission therethrough, but except for this limitation fibers of diameters above this may be readily made.

After the fiber bundles are made as herein taught they may either be used individually, or combined by utilizing a transparent adhesive into larger bundles. Any size bundle may thus be made, depending upon the end use thereof.

Either the individual bundles, or bundle composites may be subjected to a mild fusion procedure to cause adherence thereof. By such a procedure the coating materials are softened, but the core members are left untouched.

In FIGURE 3, a circular electrical heating element 14 is shown as circumferentially positioned about the cylinder encased rods 11. By softening such unit followed by the application of tension thereto in the direction of the arrow there results a thin elongated unitary flexible fiber bundle. A perspective view of this is presented in FIGURE 4.

It will be understood that modifications and variations may be effected without departing from the spirit or scope of the novel concepts of the present invention.

I claim as my invention:

The method of making a bundle of aligned optically insulated transparent fiber members consisting of the steps of: longitudinally aligning a multiplicity of transparent rod members formed of a material having a predetermined refractive index in side-by-side relation within the lumen of a transparent cylinder member which is formed of a material having a lower index of refraction than the index of said rod members, said rod members being selected so as to have substantially the same coefficient of thermal expansion as said cylinder member, and said cylinder member being selected so as to have a lower melting point than that of said rod members, and heating such combination to a temperature above the softening point of said cylinder member to allow the material comprising said cylinder member to flow into the volume surrounding said rod members before the rod members are drawn out, and then heating such combination to soften said rod members while drawing such combination to concurrently lengthen and reduce the diameter of said rod members into fibers and to cause the material of lower refractive index to form insulating coatings about said fibers and to hold said fibers together as an elongated unitary flexible bundle.

References Cited by the Examiner

UNITED STATES PATENTS

| | | | |
|---|---|---|---|
| 1,899,146 | 2/33 | Gross | 161—177 |
| 2,313,296 | 3/43 | Lamesch | 65—2 X |
| 2,608,722 | 9/52 | Stuetzer | 65—4 X |
| 2,635,390 | 4/53 | Parker | 65—31 |
| 2,652,660 | 9/53 | Kurz | 65—45 |
| 2,726,185 | 12/55 | Howald | 88—1 |
| 2,825,260 | 3/58 | O'Brien | 88—1 |
| 2,938,821 | 5/60 | Nack | 88—1 |
| 2,980,957 | 4/61 | Hicks | 65—13 X |

FOREIGN PATENTS 179,905   10/54   Australia.

OTHER REFERENCES

"Nature," dated January 2, 1954, pages 39 to 41.

DONALL H. SYLVESTER, *Primary Examiner.*

EMIL G. ANDERSON, CHARLES R. HODGES, MORRIS O. WOLK, *Examiners.*